United States Patent [19]

Gorlov et al.

[11] Patent Number: 4,566,587

[45] Date of Patent: Jan. 28, 1986

[54] ANGLE SCRAPER CHAIN FACE CONVEYOR

[75] Inventors: Viktor M. Gorlov, Donetsk; Evgeny I. Kiselev, Kopeisk; Alexandr G. Levin; Valentin I. Kutovoi, both of Donetsk; Jury F. Tverezy, Kopeisk; Igor V. Spivak, Donetsk, all of U.S.S.R.

[73] Assignee: Donetsky Nauchno-Issledovatelsky Ugolny Institut, Donetsk, U.S.S.R.

[21] Appl. No.: 391,680

[22] Filed: Jun. 24, 1982

[51] Int. Cl.[4] .............................................. B65G 19/26
[52] U.S. Cl. .................................. 198/732; 198/735; 198/860.3
[58] Field of Search ............... 198/732, 735, 860, 861, 198/725, 728; 299/43, 44, 64, 65, 66

[56] References Cited

U.S. PATENT DOCUMENTS

| | | | |
|---|---|---|---|
| 2,031,054 | 2/1936 | McCarthy | 198/861 |
| 2,629,484 | 2/1953 | Thomson | 198/861 |
| 3,000,490 | 9/1961 | Sebastian | 198/860 |
| 3,151,733 | 10/1964 | Coppee | 198/735 |
| 3,367,718 | 2/1968 | Hauschopp | 198/861 |

FOREIGN PATENT DOCUMENTS

| | | | |
|---|---|---|---|
| 2719332 | 11/1978 | Fed. Rep. of Germany | |
| 2409935 | 6/1979 | France | |
| 783412 | 9/1957 | United Kingdom | 198/732 |
| 2011851 | 7/1979 | United Kingdom | |
| 242831 | 5/1969 | U.S.S.R. | |
| 804549 | 2/1981 | U.S.S.R. | 198/732 |

OTHER PUBLICATIONS

Article "Martinka Avoids Headgate Dust", *Coal Age*, Dec. 1980, pp. 104-106.

*Primary Examiner*—Joseph E. Valenza
*Assistant Examiner*—Daniel R. Alexander
*Attorney, Agent, or Firm*—Fleit, Jacobson, Cohn & Price

[57] ABSTRACT

An angle scraper chain face conveyor comprising a pan line which includes pans that couple one another in a separable fashion forming a face part and a gate part coupled together in a separable fashion by means of an angle section. The conveyor also includes two chain assemblies each having its conveying run situated in a conveying channel of the pan line and also having its return run situated in a return channel of the pan line. There are flights which are joint-coupled with the chain assemblies. A drive section comprises three parts which are coupled together in a separable fashion. A first part of said three parts of said drive section has a portion whose shape is the same as that of the conveying channel, is situated adjacent to said conveying channel and has attachment elements adapted to couple it with said gate and face parts. A second part of said three parts of said drive section has a portion whose shape is the same as that of the return channel, and is situated adjacent to the return channel and between said first and third parts. A tail section comprises two parts which are coupled together in a separable fashion. A first part of said two parts of said tail section represents a mirror reflection of said first part of said drive section, is situated adjacent to the conveying channel, and has attachment elements adapted to couple it with said face and gate parts. A second part of said two parts of said tail section whose shape is same as that of the return channel is situated adjacent to the return channel. The angle section has attachment elements adapted to couple it with the face and gate parts.

7 Claims, 10 Drawing Figures

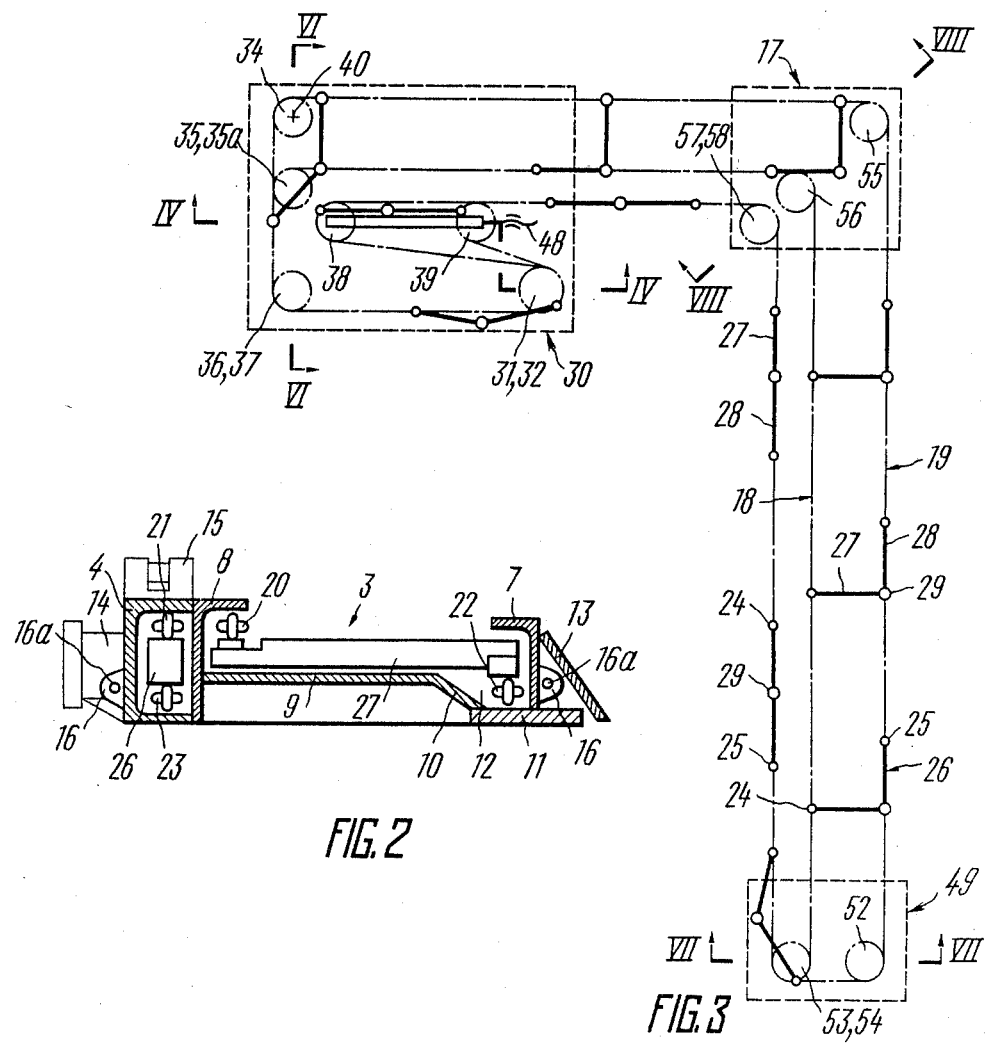

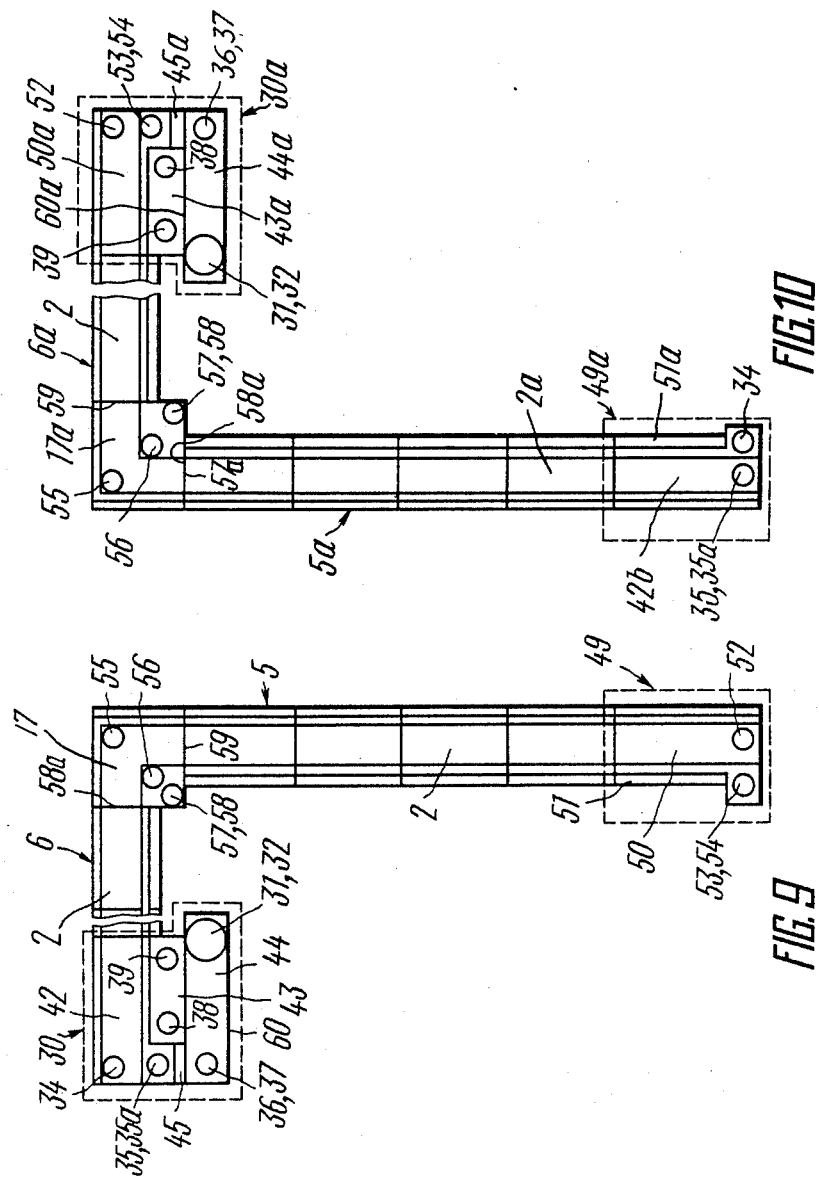

ANGLE SCRAPER CHAIN FACE CONVEYOR

The invention relates to conveying equipment and more particularly to an angle scraper chain face conveyor.

The instant invention can preferably find applications in underground coal production, thereby providing for coal haulage from a coal face to a roadway adjacent thereto; said roadway houses other haulage means by which the coal is carried to the extraction shaft and is then drawn therethrough to the surface. It should be borne in mind that the disclosure chiefly deals with coal production techniques supported by longwall faces.

The angle scraper chain face conveyor as disclosed in the instant invention can also be used for conveying load in bulk and piece loads, which are handled at industrial enterprises belonging, for instance, to mechanical engineering, agriculture, the motor industry and the food industry, including such production processes which require that the direction of load conveying be changed, say, by 90° in such a manner that no reloaders are employed within the area where the direction of load conveying is changed.

Owing to the fact that the demand for coal is constantly increasing, coal men in many countries try to solve many mechanization problems which concern, in particular, the development and construction of mechanized coal winning systems. Such systems should employ on a mandatory basis a scraper chain face conveyor on which depends the operation of the power loader and powered support.

The constructional features of a scraper chain face conveyor are responsible not only for the effective conveying of the coal, which has been separated from the coal block by the power loader, to other haulage means, but also influence markedly the working hours and techniques relating to a number of operation steps that accompany coal extraction. For instance, the tail sections of a scraper chain face conveyor tend to limit the movement of the power loader, which works from the conveyor frame. As a result, one must mine the face ends manually and not by the power loader itself. Otherwise, the coal production scheme should be varied considerably, with the conveyor tail sections arranged in the roadways adjacent to the face.

The disadvantages concerned with the arrangement of the conveyor tail sections in the roadways adjacent to a coal face are as follows: the coal production scheme becomes more complex, there results a considerable increase in the expenditures for driving roadways of enlarged crosssection, the special-purpose equipment cost is increased since face-end supports must be constructed, etc.

While limiting the movement of the power loader, the tail sections of a scraper chain face conveyor do not allow for mechanized coal loading by means of the cutting element of the power loader. As a result, the coal should be loaded manually within the area occupied by these tail sections. The workers performing this operation step are in the immediate proximity to the face in this case. Their work, therefore, is labor-consuming and dangerous since the face is destroyed under the action of rock pressure and the resulting lumps of coal often traumatize the workers.

It should be noted that maintenance of scraper chain face conveyors is difficult. The gum that gets into the conveyor return channel, when the conveying channel carries the coal, hinders the movement of the chain assembly. This often results in the breakdown of the chain assembly and its parts. In underground conditions and especially when mining thin seams whose thickness is below 1.2 m, one cannot locate the faulty assemblies with ease. The remedial work requires that the operation of the coal extraction system as a whole be stopped and its operational capability is thus reduced. There exists in this connection an urgent problem of developing a scraper chain face conveyor which could meet the requirements of underground coal production by longwall mining.

Known in the art is a double-chain flight conveyor (cf. the USSR Inventor's Certificate No. 242,831, Int. Cl. E21f) comprising a drive assembly, an intermediate section, an angle section, pans that form a pan line, a tail head and two chain assemblies. The chain assemblies are implemented in the form of endless round-link chains each mounting in a cantilever fashion flights spaced at a given spacing. The chain assemblies are made closed vertically. The angle section carries deflector pulleys and a guide, which are arranged respectively on the smaller and the greater radius of rotation of the angle section.

The conveyor moves the coal along the pan line by virtue of the flights of each of the chain assemblies. One chain assembly moves around the deflector pulleys while the other moves around the guide.

The described conveyor can convey coal at an angle of 90° with respect to the face plane. Since the chain assemblies mount the flights in a cantilever fashion, the flights cannot be maintained stable during conveyor operation and this applies especially to the angle section. When the chain assembly moves around the guide of the angle section, sliding friction is the result, the guide is thus subject to intense wear, and the conveyor gets out of order quickly. In addition, cantilever-type attachment of the flights tends to limit the conveyor capacity. The fact that the chain assemblies are closed vertically does not allow for easy access to the return runs of the chain assemblies. This makes the maintenance of the conveyor complicated; in particular, it is not easy to remedy failures connected with the ruptured chains and broken flights. Since the conveyor has both tail and angle sections, the movement of the power loader along the pan line is limited. As a result, stables are to be prepared manually or special-purpose power loaders are required which must have long arms for controlling their working assemblies. Of course, this leads to an increase in coal cost.

There is known a conveyor with twin inboard chains (cf. French Patent No. 2,409,935, Int. Cl. B65 G 19/10) comprising a pan line, two chain assemblies and an angle section. The pan line is implemented in the form of an integral structure including a conveying channel arranged above a return channel. The chain assemblies are closed vertically. They are positioned close to each other, each on the respective side facing the longitudinal axis of symmetry of the pan line, and some distance away from this axis. The flights have their mid portions attached to the chain assemblies, and also have their ends located in the guides of the pan line. Each flight is provided with a means by which it is attached to the respective chain. Said means make it possible to turn the chains in such a manner that they are arranged one above the other when they pass over the angle section. During the further movement of the flights, the chains are drawn back to their initial positions, positioned close to each other and maintained in the plane of the pan bottom.

As shown in a plan view, the angle section is an arc subtended by an angle of 90°. The bottom of the angle section has guiding channels for the conveying and return runs of the chain assemblies. The guiding channels are profiled to fit the shape of the means adapted to attach the flights to the chains. These channels provide for the turning of the chain assemblies on the angle section and for setting of them one above the other. The angle section has deflector pulleys, which interact with the chain assemblies and allow them to be rotated along the arc of a given radius in the seam plane.

Rollers installed on flight ends or on the sidewalls of the angle section make it possible to reduce the resistance to the movement of the chain assemblies.

Turning the chain assemblies on the angle section, while arranging the chains one above the other, allows one to eliminate the adverse effect exerted on the conveyor operation by the difference between the pulls established in the chain assemblies on account of the different paths followed by them.

Since the conveying and return runs of the chain assemblies are arranged one above the other while on the angle section, the supporting forces acting via the both chain assemblies and via the flights on the deflector pulleys tend to increase with increasing power of the drive and length of the conveyor. As a result, the pulleys and flights wear away and the normal operation of the conveyor is disturbed. It should be noted that the conveyor described has sophisticated design features. Every flight attachment means must provide for the turning of the chain assemblies and setting of the chains one above the other. The bottom of the angle section has a profile differing from that of the pan bottom. The flights and sidewalls are provided with a great number of rollers, which cannot be brought into substantially free movement resisted by small particles of rock and coal in which the rollers run.

The deflector pulleys on the angle section require special maintenance procedures in operation since the gum available on the angle section gets from the conveying to the return channel and the bearings mounting the pulleys pick up the gum. To remove the gum from the angle section it is necessary to stop the conveyor. Experience shows that this should be done several times per shift. As a result, working hours are lost and coal output is reduced.

The principle of operation of a twin inboard chain conveyor and the use, in particular, of deflector pulleys of a large diameter on the angle section requires a decreased spacing at which the flights are spaced in order to resist their skew and coming off the guides of the angle section. The decreased flight spacing leads to an increase in the amount of metal used by the chain assemblies, to greater pull and to an increase of the amount of energy required by coal conveying.

In addition, with the flight spacing decreased, there results an increase in the amount of gum drawn by the chain assemblies into the return channel. This creates a resistance to the movement of the chain assemblies and disturbs the conveyor operation. The elimination of troubles in the mine is a labor-consuming procedure since the return runs of the chain assemblies are difficult to access and trouble-shooting requires much time.

Like in the double-chain flight conveyor described above, the tail and angle sections of the twin inboard chain conveyor are responsible for a limited movement of the power loader along the pan line. This requires manual preparation of stables or a considerable modification of the production techniques applicable to a coal face, including the following: the tail and angle sections should be arranged in a gate, and use should be made of special-purpose equipment such as a face end support, power loaders having long arms for controlling their working assemblies, etc. The situation is aggravated in conditions where no gates are previously driven, for instance, in cases concerning longwall advancing mining and driving with broad face, under these circumstances, mechanized preparation of stables presents a substantially complicated problem.

Known in the art is a flight face conveyor (cf. an opposed FRG patent application No. 2,719,332, Int.Cl.B65 G 21/16), comprising two pan lines, face and gate, which form a united system and are located at right angles to each other.

Recall that a pan line comprises two adjacent channels. One channel is a conveying channel, in which coal is conveyed, while the other is a return channel. In the described embodiment, the conveying channel is above the return one. To carry the coal via the conveying channel, use is made of two chain assemblies, which are vertically closed and arranged in the central portion of the pan line.

The chain assemblies mount flights spaced at some distance from one another. The flights are the elements that act directly on the coal when the chain assemblies move in the conveying channel. The flights are affixed by their mid portions to the chain assemblies and arranged in the form of wings on both sides of the chain assemblies.

There is an angle section which is adapted to change the direction of conveying by 90°. The angle section is essentially a pan of curvilinear shape, which is bent on a radius relative to the axle that bears deflector pulleys of a large diameter. The deflector pulleys are adapted to direct the chain assemblies along a path of a certain radius.

The deflector pulleys are rotatably mounted on a common axle.

Since the pan line is bent by 90°, the chain assemblies do so, too. The difference between the paths the chain assemblies follow during their movement is due to the different distances that separate them from the axis of rotation of the pulleys. For this reason, the pulleys should be so implemented that they are able to equalize the difference between the pulls developed in the chain assemblies. In particular, the pulleys are embodied so that cams are arranged on their periphery. The cams enter the spacings between the flights, whereas the pulley recesses support the end faces of the flights.

With this embodiment of the conveyor providing for a change of the direction of conveying by 90°, the pulleys interacting with the chain assemblies and flights are subject to large supporting forces. The values of these forces are so great that the conveyor quickly goes out of order due to the wear of flight ends, cams, etc.

The gum that gets into the space between the pulley cams when it is carried into the return run of the chain assembly hinders the movement of the latter and causes a more intense wear. The fact that a greater amount of gum is led into the return channel of the pan line of the conveyor is accounted for by the employment of deflector pulleys of a large diameter since in this case the stable position of the flights on the angle section is obtained by decreasing the flight spacing down to 216 or 252 mm in angle-type conveyors as compared to the flight spacing of 432, 504 or 1000 mm in conventional conveyors. With the chain assemblies so implemented, their mass increases by 60 percent, approximately. Under these circumstances, a great amount of gum available in the return channel leads to ruptured chain assemblies, broken flights, etc.

Counteracting these drawbacks in operation means a considerable loss of working hours, with the result that less coal is extracted from a coal face.

In the described conveyor, the tail and angle sections thereof have each a greater height than the pan line. It is difficult, therefore, to win coal at face ends with the working assembly of the power loader, and manual mining is required and unsafe operation conditions for the workers are thus created.

The fact that the tail and angle sections limit the movement of the power loader is chiefly on account of the conveyor design features and, in particular, the vertically closed chain assemblies. This does not allow one to have a pan line of a small height since the conveying channel is arranged above the return channel. In the case of relatively thin seams, less than 1.2 m thick, this disadvantage seriously affects the development and design of adequate coal face equipment.

Known in the art is an angle scraper chain face conveyor (cf. the USSR Inventor's Certificate No. 804,549, Int. Cl.B65 G 19/10) comprising a pan line which includes a number of pans coupled together in a detachable fashion, two horizontally closed chain assemblies, flights, drive, angle and tail sections with drive and deflector pulleys for the chain assemblies, said pulleys being rotatably mounted on vertical axles.

The pan line comprises individual sections, usually 1.5 to 2.0 m long, which are called pans. The pans are joint-coupled. A group of serially positioned pans constitutes a face part of the pan line, i.e. that part thereof along which the power loader moves.

The other group of the pans, arranged in a similar way, constitutes a gate part of the pan line, this part being arranged in the roadway adjacent to the coal face. Here the pans are asymmetric as sectioned across the longitudinal axis of the pan line. The two parts of the pan line are joined together at right angles to each other by means of the angle section.

The angle section is adapted to change the direction of conveying and is similar constructionally to a pan, but has a differing feature consisting in the fact that it is rectangular as shown in a plan view. The angle section couples the adjoining pans by virtue of joints. It bears deflector pulleys in the form of sprockets which are rotatably mounted on vertical axles.

The chain assemblies of the described conveyor are adapted to carry the coal being transported. They are implemented in the form of round-link chains closed horizontally. The flights, which are elements acting direct on the coal available in the conveying channel, have their ends joint-affixed to the chain assemblies. One chain assembly is located above, and the other, below the flights.

Each flight includes two joint-coupled parts. The flights are coupled to the chain assemblies in succession. The joint-coupled parts of the flights are positioned in the conveying channel in an L-shaped fashion to each other. When in the return channel, both flight parts form a single line. In the face part of the pan line, one of said parts of an L-shaped flight acts directly on the coal being conveyed. After passing through the angle section, the coal is dealt with by the other flight part.

The drive section of the described conveyor is adapted to drive the chain assemblies together with flights both in the conveying and the return channel. The drive section is adjacent to that end of the gate part of the pan line which is in a remote location with respect to the angle section.

The drive section mounts drive and deflector pulleys implemented in the form of sprockets, which are shaped to meet the shape of the round-link chains of the chain assemblies. Two drive sprockets are set in a paired fashion on a vertical axle and mounted beyond the pan line. The drive sprockets are coupled kinematically with an electric motor, which may be installed near the drive section and adapted to rotate the drive sprockets. Two deflector sprockets are arranged in a coaxial relation to each other while two other deflector sprockets are positioned between the gate part of the pan line and the drive sprockets.

The tail section is adapted to provide for the movement of the chain assemblies from the return to the conveying channel of the face part of the pan line.

The tail section is positioned adjacent to that end of the face part of the pan line which is located remote from the angle section. The tail section bears deflector pulleys implemented in the form of deflector sprockets. The latter are rotatably mounted on vertical axles. Two sprockets among the deflector sprockets of the tail section are arranged in a coaxial relation to each other. They are positioned, like the coaxial sprockets of the drive section, in such a manner that their axles are spaced to allow the flights to pass between them.

The pans featuring an asymmetric shape in a section across the longitudinal axis of the conveyor do not allow one to reassemble the conveyor in the case when it is necessary to direct the gate part either to the left or right with respect to the face part depending on the operating conditions. Therefore, with the described conveyor, no provision is made for mining in both the left- and right-hand face. Recall that by the left-hand face is meant the mineral surface under mining which is positioned on the left of the direction of movement of the power loader viewed from the angle to the tail section. On the other hand, the right-hand face is treated as that mineral surface under mining which is positioned on the right of the direction of movement of the power loader viewed from the angle to the tail section.

The maintenance and assemble/disassemble procedures for the described conveyor require much labor. This is explained by the fact that the tail and angle sections have large dimensions and mass. Consequently, this feature is disadvantageous in the case of confined spaces connected with undergound coal production, especially in seams whose thickness is below 1.2 m.

Since the described conveyor fails to provide for both left- and right-hand face operation, manoeuvrability of mining work is poor as is concerned with the possibility of selecting the direction of advancing the coal face.

With the conveyor under discussion, it is difficult to perform repair work. For example, a failure to any assembly of the drive or tail section requires in most cases that the section at fault be replaced as a whole, a labor-consuming operation in which many working hours are lost.

Another drawback with this conveyor is that the manufacturer must fabricate two versions thereof, one for the left-hand face and the other for the right-hand face. The operating conditions that usually exist in one mine require that the coal face be advanced in different directions. Thus, with the necessity of employment of two versions of the described conveyor, an increased number of spare parts is needed, with the result that the equipment cost on the user's side is increased.

In the known conveyor, the contact of the chain assemblies made with the drive and deflector pulleys is poor. This is explained by the fact that the chain assemblies tend to lengthen in operation. Under these circumstances, the effect of the mass of the chain assemblies closed horizontally is such that their contact with the drive and deflector pulleys is disturbed. The separation of the chain assemblies from the pulleys might cause critical failures connected, for instance, with the ruptured chain assemblies, broken pulleys and flights, etc. The elimination of such failures leads, of course, to the saving of many working hours.

A principal object of the present invention is the creation of an angle scraper chain face conveyor implemented in such a manner that one can assemble and reassemble the conveyor under conditions of underground coal production so that the coal can be conveyed from the coal face to the adjoining roadway while ensuring the left- and right-hand face operation.

Another object of the instant invention is to provide an angle scraper chain face conveyor implemented so that its maintenance in operation is simple.

Yet another object of the invention is to provide an angle scraper chain face conveyor whose design features allow one to assemble and disassemble it with ease under conditions of underground coal production.

Still another object of the invention is to provide an angle scraper chain face conveyor with which the coal face can be advanced in the direction determined by the mining conditions.

These and other objects are provided by an angle scraper chain face conveyor comprising a pan line which includes pans that couple one another in a separable fashion forming a gate part and a face part, said parts coupling each other in a separable fashion by virtue of an angle section, two chain assemblies which are closed horizontally and have each a conveying run positioned in a conveying channel of the pan line and a return run positioned in a return channel of the pan line, flights implemented each in the form of two parts which are joint-coupled with each other and with the chain assemblies, a drive section provided with drive and deflector pulleys for the chain assemblies and coupled with that end of the gate part of the pan line which is at a most remote location with respect to the face part of the pan line, and a tail section provided with deflector pulleys for the chain assemblies and coupled with that end of the face part of the pan line which is at a most remote location with respect to the gate part of the pan line. According to the invention, the drive section comprises three parts which couple to one another in a separable fashion, a first part of said three parts of said drive section adapted to mount respective deflector pulleys has a portion implemented in the form of the conveying channel of the pan line, is located adjacent to the conveying channel of the gate part of the pan line and has attachment elements adapted to couple it with the gate and the face parts of the pan line. A second part of said three parts of said drive section mounting respective deflector pulleys has a portion implemented in the form of the return channel of the pan line and is located adjacent to the return channel of the gate part of the pan line and between said first part and a third part of said three parts of the drive section, which is adapted to mount respective drive and deflector pulleys. The second and third parts have their axes of symmetry passing in parallel with the geometric longitudinal axis of the gate part of the pan line, said tail section being implemented in the form of two parts which couple each other in a separable fashion. A first part of said two parts of said tail section, which mounts respective deflector pulleys, is implemented as a mirror reflection of said first part of said drive section, located adjacent to the conveying channel of the face part of the pan line and has attachment elements adapted to couple it with the gate and the face parts of the pan line. A second part of said two parts of said tail section is shaped like the return channel of the pan line and located adjacent to the return channel of the face part of the pan line, and the angle section being provided with attachment elements adapted to connect it with the gate and the face parts of the pan line.

With the described embodiment of the conveyor of the invention, one can disassemble and reassemble it in such a manner that the newly reassembled conveyor represents a mirror reflection of the old conveyor available prior to disassembly.

Given, thus, one version of the disclosed conveyor and having performed the above reassembly procedure, one can use the conveyor in both the left- and right-hand faces or, in other words, in a coal face advanced in a direction opposite to that in which the old coal face has been advanced. This reassembly procedure is comparatively simple to perform underground.

In addition, the described embodiment of the conveyor of the invention ensures its simple maintenance. If a need arises, one can replace immediately in the mine (and what is more important, in confined spaced) the faulty part of the drive or the tail section of the conveyor and no complete replacement of the section of interest is needed in this case.

The disclosed embodiment provides a condition in which the desired version of the conveyor is obtained during assembly depending on the preparation of the mining area where the coal is to be extracted and conveyed.

This means that with the direction of advancing the coal face selected the respective assembly procedure can position the gate part of the pan line either to the left or right of the face part of the pan line in accordance with the existing operating conditions.

Moreover, the disclosed embodiment allows the manufacturer to simplify the associated production processes since he has no need to fabricate two conveyor versions, one for the left-hand face and the other for the right-hand face.

With the disclosed embodiment, spare parts cost on the user's side is reduced since only one conveyor version is required.

Advantageously, the second part of the drive section should be implemented in the form of a carriage, which is allowed to be moved with respect to the first and the third part of the drive section.

With this embodiment of the drive section, the drive and deflector pulleys can be maintained in more reliable engagement with the chain assemblies. This markedly improves the operation of the conveyor as a whole.

This advantageous effect can be achieved by subjecting the second part of the drive section of the operative conveyor to the action of a pulling device. It is good practice to use for the purpose a hydraulic jack of conventional design. The jack may take the working fluid from certain sources available in the mine, for instance, from the pump station of the hydraulic powered support. As a result, no special pump station is required in these conditions.

The pull applied to the second part of the drive section, which mounts the deflector pulleys, makes it possible to provide for the desired tension in the chain assemblies when operating the conveyor. Under these circumstances, the dynamic behavior characteristic of the operation of the third part of the drive section accommodating the drive pulleys is not practically imparted to the second part of the drive section. Also, this influences favourably the operation of the chain assemblies.

Preferably, the first and third parts of the drive section should be provided with guides while the second part of the drive section must have grips adapted to interact with the guides.

As a result, the second part of the drive section is maintained stable with respect to the first and third parts.

The described embodiment of the second part of the drive section allows for a comparatively simple way in which the drive pulleys mounted on the second part of the drive section can run horizontally, each of said deflector pulleys works independently with a respective chain assembly. This provides for forced tension of the chain assemblies during conveyor operation, and separation of the chain assemblies from the pulleys is eliminated almost completely.

Advantageously, the second part of the drive section should use two deflector pulleys mounted on vertical axles, which are spaced at some distance in a vertical plane sufficient for the flights to pass between them and which are also positioned some distance away from each other as related to the longitudinal axis of symmetry of said second part of the drive section, said latter distance being equal substantially to the distance between the joint members that couple the flight ends with the chain assemblies, with the flights positioned in the return channel of the pan line.

With the deflector pulleys of the second part of the drive section arranged according to the above embodiment, the second part of the drive section can be employed when either of the two versions of the conveyor is obtained during the reassembly procedure.

In addition, this embodiment provides for reliable leading of the flights from the drive section into the return channel of the gate part of the pan line. Under these circumstances, the joint-coupled parts of the flights are arranged as a single line and the attachment elements, that couple the flight parts with the chain assemblies, are not subject to extra loads. Since the flight parts are arranged in a single line parallel with the conveying channel, there results a considerable decrease in the width of the return channel as compared to the conveying channel and, as a consequence, the pan as a whole. Thus, favourable conditions are established in which the roof can be held above the face part of the pan line since the supports can be installed in this case as close to the face part as possible.

Moreover, the arrangement of the return run of the chain assemblies in the return channel positioned in the vicinity of the conveying channel, allows one to use simple maintenance procedures for the conveyor. This means that there is an easy access to the return run of the chain assemblies when carrying out repair work and preventive maintenance.

Preferably, the first part of the drive section should employ three deflector pulleys for both conveying runs of the chain assemblies, two of said three deflector pulleys being mounted in a coaxial relation on cantilever vertical axles spaced at a distance allowing the flights to pass between them, and a third one of said three deflector pulleys being mounted on a vertical axle, that is arranged some distance away, as measured in a horizontal plane, from said vertical axles mounting the two deflector pulleys mentioned above.

With the deflector pulleys of the above embodiment, there is no breakage of the flights and, in particular, the joint connections of the flight parts when the flights leave the first and enter the third part of the drive section.

Advantageously, the third part of the drive section should use two drive pulleys mounted on a single vertical axle and two deflector pulleys mounted in a coaxial relation on cantilever vertical axles, which are spaced at a distance allowing the flights to pass between them, the drive and deflector pulleys of the third part of the drive section being arranged along the longitudinal axis of symmetry of said third part.

With the embodiment just described, both chain assemblies are driven simultaneously and the flights reach the second part of the drive section where the flights are turned in their joint members so as to acquire a position in which they are led into the return channel.

This embodiment and, especially, the fact that the drive and deflector pulleys of the third part of the drive section are arranged along the longitudinal axis of symmetry of said third part provide a condition in which the third part of the drive section can be employed when either of the two versions of the conveyor is obtained during the reassembly procedure.

Preferably, the vertical axles mounting the deflector pulleys of the first and third parts of the drive section should lie in a single plane, the distance between the extreme deflector pulleys being selected to be equal substantially to the distance between the joint members that couple the flight ends with the chain assemblies, with the flights positioned in the return channel of the pan line.

With the deflector pulleys of the first and third parts of the drive section so arranged, one can attain a steady condition in which the chain assemblies move towards the drive pulleys. Under these circumstances, no extra loads are applied to the joint members of the flights, with the result that operational reliability of the chain assemblies is increased.

It is seen that the angle scraper chain face conveyor of the invention can be assembled and reassembled under conditions of underground coal production in such a manner that coal can be transferred from the coal face to its adjoining roadway, thereby providing for both the left- and right-hand face mining.

With either of the two versions of assembly of the conveyor of the invention, assembly/disassembly work is simple and operational reliability is high.

The invention will now be described in more detail, by way of example, with reference to the accompanying drawings in which:

FIG. 2 is an enlarged sectional view on the line II—II of FIG. 1, with thin lines encircling the jack bracket and the pin rack, according to the invention;

FIG. 3 shows a kinematical diagram of an angle scraper chain face conveyor, with dotted lines encircling the drive, tail and angle sections, according to the invention;

FIG. 9 is a diagrammatic representation of an angle scraper chain face conveyor intended for left-hand face operation, a diminished plan view, with the chain assemblies and flights not shown, according to the invention; and FIG. 10 is a diagrammatic diminished plan view of an angle scraper chain face conveyor intended for right-hand face operation, with the chain assemblies and flights not shown, according to the invention.

Figure 1:
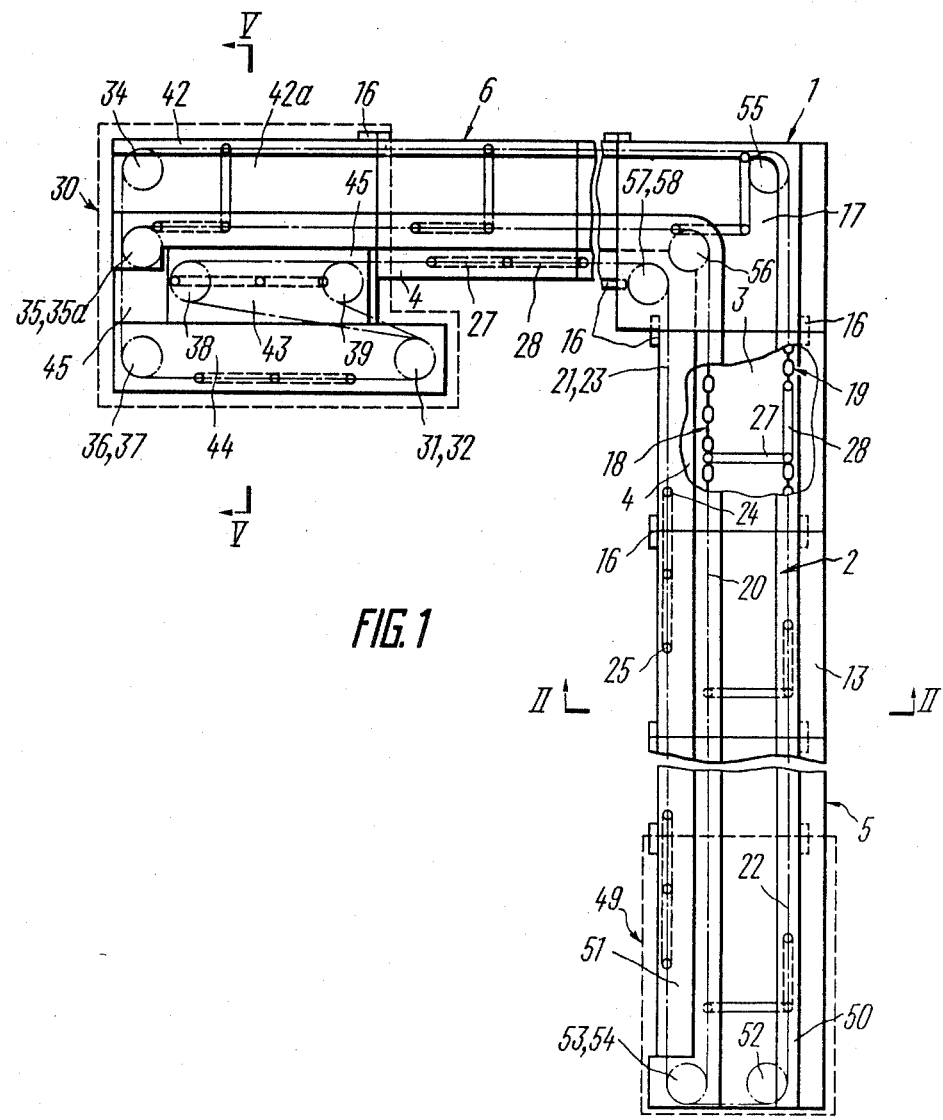
FIG. 1 is a diagrammatic representation of an angle scraper chain face conveyor, a plan view, intended for left-hand face operation, with dotted lines encircling the drive and tail sections, according to the invention.

Referring to FIG. 1, the angle scraper chain face conveyor of the invention (which is referred to hereinafter as a conveyor) comprises a pan line 1 including pans 2 that couple one another in a separable fashion. The pan line 1 is formed by a conveying channel 3 and a return channel 4 comprising the pans 2 and positioned close to each other.

The conveying channel 3 and the return channel 4 are positioned in a close and parallel relation to each other. The pan line 1 includes a face part 5 and a gate part 6.

The face part 5 is adapted to receive the coal delivered by the power loader (not shown) and is a base on which the power loader depends for its movement along the face.

The gate part 6 is adapted to receive the coal delivered from the face part 5 and then transfer it to other haulage means (not shown).

Each pan 2 has sidewalls 7 and 8 (FIG. 2) coupled together with a bottom 9. Rigidly affixed to the sidewall 8 is the return channel 4. The sidewalls 7 and 8 form together with the bottom 9 the conveying channel 3. Each pan 2 is asymmetric as viewed in a section across the longitudinal axis of the pan line 1, and the return channel 4 and sidewall 8 tower above the sidewall 7 while the bottom 9 has a portion 10 bent downwards and forming together with a base plate 11 and the sidewall 7 a channel 12 whose longitudinal axis is parallel with that of the pan 2.

The pans 2 forming the face part 5 bear ramp plates 13, brackets 14 for jacks intended to move the conveyor (said jacks are not shown in the figure), and a pin rack 15 for the feed mechanism (not shown) of the power loader, said feed mechanism being intended to move the power loader along the face part 5 of the pan line 1.

To provide for interchangeability of the pans 2 included in the face and gate parts 5 and 6, the ramp plates 13, brackets 14 and pin racks 15 are affixed in a detachable fashion by using bolt connections of known design (not shown).

To make the pans 2 forming the pan line 1 detachable, use is made of attachment elements 16 of any known design, for instance, locks; the described embodiment uses bolt-type locks. FIG. 2 shows that the attachment elements 16 are rigidly attached by means of welding to the sidewall 7 and return channel 4. Following standard practice, the attachment elements 16 are made as paired mating parts each of which is attached to a respective one of adjacent pans 2. Some of the attachment elements 16 are provided with seats (not shown) which mate with their respective lugs (not shown) on other attachment elements 16, thereby ensuring proper alignment of the coupled pans 2. The attachment elements 16 have holes 16a adapted to receive the connecting bolts (not shown).

The face and gate parts 5 and 6 are coupled together in a detachable fashion at substantially right angles to each other by means of an angle section 17 (FIG. 1). Attachment elements 16 are used to couple the angle section 17 with the face part 5 and the gate part 6. The attachment elements 16 are arranged on the angle section 17 in such a manner that any one of the pans 2 included in the pan line 1 can be coupled with the angle section 17.

The angle section 17 adapted to form a united pan line 1 from the face part 5 and the gate part 6 has its cross-section coinciding in shape with that of the conveying channel 3 and the return channel 4.

The angle section 17 makes it possible to change the direction of conveying so that the coal is delivered from the face part 5 to the gate part 6 of the pan line 1.

The conveyor of the invention comprises chain assemblies 18 and 19, which are implemented in the form of round-link chains closed horizontally. The chain assembly 18 has a conveying run 20 and a return run 21 (FIG. 2), while the chain assembly 19 has a conveying run 22 and a return run 23.

The conveying runs 20 and 22 of the chain assemblies 18 and 19, respectively, are positioned in the conveying channel 3. The return runs 21 and 23 of the chain assemblies 18 and 19, respectively, are positioned in the return channel 4.

An easy access to the return runs 21 and 23 of the chain assemblies 18 and 19 is ensured due to the provision of ports (not shown) in the return channel 4 of the pan line 1.

The chain assemblies 18 and 19 have their respective joint members 24 and 25 (FIG. 3) which couple them to flights 26.

Every flight 26 comprises parts 27 and 28 which couple each other by virtue of a joint member 29. The chain assemblies 18 and 19 are positioned respectively above and below the flights 26.

The chain assemblies 18 and 19 are adapted to transmit the pull developed by the drive means of the conveyor (not shown), which may be of any suitable design. The flights 26 attached to the chain assemblies 18, 19 are designed to exert direct action on the coal carried by the conveying channel 3.

The flights 26 are maintained in an L-shaped position when in the conveying channel 3 of the pan line 1. In the return channel 4, the parts 27, 28 of the flights 26 are arranged in a single line.

Figure 4:
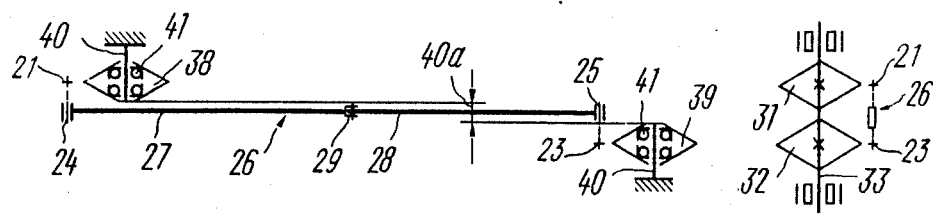
FIG. 4 is an enlarged sectional view on the line IV—IV of FIG. 3, according to the invention.

The disclosed conveyor comprises a drive section 30 (FIG. 1) with drive pulleys 31, 32 on a common axle 33 (FIG. 4) and with deflector pulleys 34, 35, 35a, 36, 37, 38, 39 (Fig. 1).

The deflector pulleys 38, 39 sit on cantilever vertical axles 40 (FIG. 4) and are rotatably mounted in bearings 41. The deflector pulleys 34, 35, 35a, 36, 37 are mounted in a similar way.

The drive pulleys 31, 32 are implemented in the form of sprockets whose teeth have a shape to fit that of the round-link chains of the chain assemblies 18 and 19.

The drive pulleys 31 and 32 are designed to transmit the torque from the drive means to the chain assemblies 18 and 19.

The deflector pulleys 34, 35, 35a, 36, 37, 38, 39 are designed to lead the flights 26, which are affixed to the chain assemblies 18, 19, from the conveying channel 3 to the return channel 4 of the pan line 1.

The drive section 30 (FIG. 1) comprises parts 42, 43, 44. The first part 42 mounts the deflector pulleys 34, 35, 35a. It has a portion 42a whose shape is identical with that of the conveying channel 3 of the pan line 1. The portion 42a is adjacent to the conveying channel 3 of the gate part 6 of the pan line 1.

The first part 42 of the drive section 30 also has attachment elements 16 which couple it with the gate part 6 or the face part 5 of the pan line 1.

The second part 43 of the drive section 30 carries the deflector pulleys 38, 39, and it has a portion whose shape is identical with that of the return channel 4 of the pan line 1 and that is positioned adjacent to the return channel 4.

The third part 44 of the drive section 30 carries the drive pulleys 31, 32 and deflector pulleys 36, 37.

The second part 43 is located between the first and third parts 42 and 44, respectively, of the drive section 30.

The second part 43 and third part 44 of the drive section 30 each have an axis of symmetry that passes in parallelism with the geometric longitudinal axis (not shown) of the gate part 6 of the pan line 1.

The parts 42, 43, 44 are coupled together in a detachable fashion.

The first part 42 couples the third part 44 via a plate 45 (FIG. 5), which serves as a foundation of the drive section 30.

It is possible to affix the parts 42, 44 to the plate 45 by means of conventional coupling elements suitable for the purpose, for example, bolt connections (not shown).

The second part 43 positioned between the first and third parts 42 and 44, respectively, of the drive section 30 is implemented in the form of a carriage, which is allowed to be moved relative to said two parts.

The parts 42 and 44 each have guides 46, while the part 43 is fitted with grips 47 adapted to interact with the guides 46.

The guides 46 rigidly affixed to the first part 42 and third part 44 of the drive section 30 are arranged to face one another. The grips 47, rigidly affixed in pairs to the second part 43, on both sides thereof, are spaced at some distance from one another so as to allow the guides 46 to be arranged between them, a small gap being set up between the grips 47 and guides 46.

Figure 5:
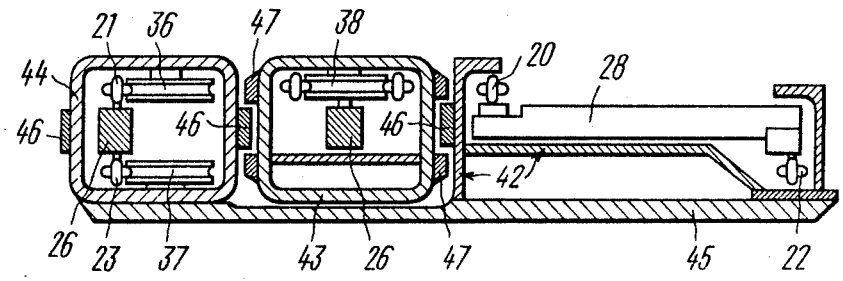
FIG. 5 is an enlarged sectional view on the line V—V of FIG. 1, according to the invention.

There is a small gap between the second part 43 of the drive section 30 and the plate 45, as is shown in FIG. 5.

A pulling device 48 (FIG. 3) is designed to move the second part 43 with respect to the parts 42 and 44. It comprises a hydraulic jack (not shown) of any conventional design.

There may be an embodiment that comprises two jacks each located on a respective side of the geometric longitudinal axis of symmetry (not shown) of the second part 43 of the drive section 30.

The second part 43 includes axles 40 mounting the deflector pulleys 38 and 39. There is a gap 40a (FIG. 4) at which the free ends of the axles 40 are spaced from each other in a vertical plane. The value of the gap 40a is selected to be sufficient for the flights 26 to pass through the gap between the axles 40.

The axles 40 arranged along the geometric longitudinal axis of symmetry of the second part 43 are spaced at a distance equal substantially to the distance between the joint members 24 and 25 of the flight parts 27 and 28, with the flights positioned in a single line in the return channel 4.

The first part 42 of the drive section 30 uses the deflector pulleys 34, 35, 35a. The deflector pulleys 34, 35 are designed especially for the conveying runs 20, 22 of respective chain assemblies 18, 19. The deflector pulleys 34, 35 are mounted on vertical axles 40 (FIG. 6), which are spaced at some distance in a horizontal plane and at a distance 40a in a vertical plane, said first distance being chosen to be substantially equal to the distance between the conveying runs 20 and 22 of the chain assemblies 18, 19. The distance 40a is selected to be sufficient for the flights 26 to pass between the pulleys 34, 35 and also between the coaxial pulleys 35, 35a.

The third part 44 of the drive section 30 uses deflector pulleys 36, 37 in addition to the drive pulleys 31, 32 mounted on a single vertical axle 33. The deflector pulleys 36, 37 are mounted on vertical axles 40. The axles 40 are arranged in a coaxial relation to each other and are spaced at a distance 40a, which allows the flights 26 to pass between them.

The drive pulleys 31, 32 and the deflector pulleys 36, 37 of the third part 44 of the drive section 30 are arranged along the geometric longitudinal axis of the third part 44.

The vertical axles 40 carrying the deflector pulleys 34, 35, 35a of the first part 42 of the drive section 30 and the deflector pulleys 36, 37 of the third part 44 of the drive section 30 lie in a single plane. The distance between the extreme pulleys, ref. Nos. 34 and 36, 37 for the parts 42 and 44 respectively, is chosen to be equal as a minimum to the distance between the joint members 24 and 25 of the parts 27, 28 of the flights 26 with the parts positioned in a single line in the return channel 4.

Figure 7:
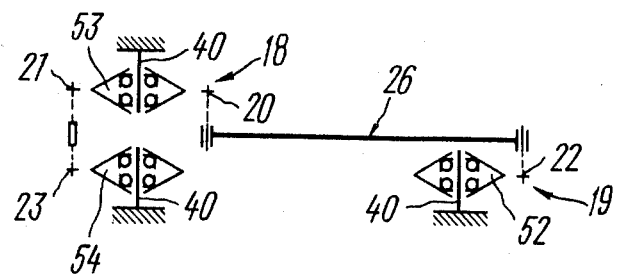
FIG. 7 is an enlarged sectional view on the line VII—VII of FIG. 3, according to the invention.

The tail section 49 of the disclosed conveyor (FIG. 1) comprises parts 50 and 51. The first part 50 uses vertical axles 40 to mount deflector pulleys 52, 53, 54 (FIG. 7) and is a mirror reflection as to its design features of the first part 42 of the drive section 30. The first part 50 is adjacent to the conveying channel 3 of the face part 5 of the pan line 1.

The first part 50 of the tail section 49 has attachment elements 16 adapted to couple it with the face part 5 or the gate part 6 of the pan line 1.

The second part 51 of the tail section 49, shaped same as the return channel 4, is adjacent to the return channel 4 of the face part 5 of the pan line 1 and is a continuation of said return channel 4. The second part 51 is affixed in a detachable fashion to the first part 50 of the tail section 49 by means of conventional bolt connections (not shown).

The tail section 49 is designed to lead the return runs 21, 23 of the chain assemblies 18, 19 into the conveying channel 3 of the face part 5 of the pan line 1.

Figure 8:
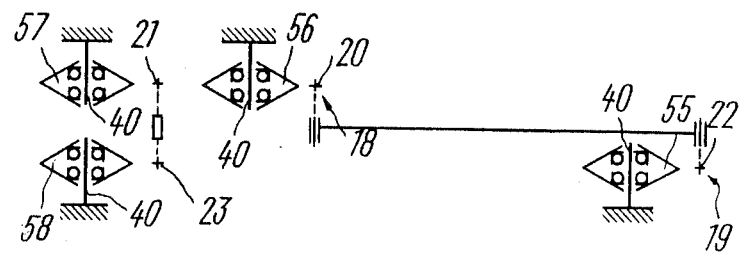
FIG. 8 is an enlarged sectional view on the line VIII—VIII of FIG. 3, according to the invention.

The angle section 17 has deflector pulleys 55, 56, 57, 58 (FIG. 8) mounted on cantilever vertical axles 40. The pulleys 55, 56 of the angle section 17 interact with the respective conveying runs 20, 22 of the chain assemblies 18, 19. The pulleys 57, 58 interact with the respective return runs 21, 23 of the chain assemblies 18, 19, and are mounted in a similar way to the pulleys 36, 37 of the third part 44 of the drive section 30.

Figure 6:
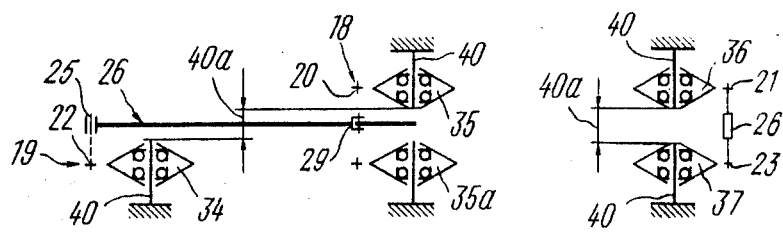
FIG. 6 is an enlarged sectional view on the line VI—VI of FIG. 3, according to the invention.

There is another embodiment that deals with deflector pulleys 34, 35, 35a, 36, 37, 38, 39, 52, 53, 54, 55, 56, 57 and 58 mounted on axles 40 together with bearings 41 as individual interchangeable assemblies. In accordance with this embodiment, the first part 42 of the drive section 30 can be implemented as follows: the deflector pulleys 34 and 35 are installed as is shown in FIG. 6 while the deflector pulley 35a is replaced during the reassembly procedure with the pulley 54 of the part 50 of the tail section 49.

The chain assembly 18 bends around the drive pulley 31 and the deflector pulleys 38, 57, 53, 56, 35, 36.

The chain assembly 19 runs over the drive pulley 32 and the deflector pulleys 39, 58, 54, 52, 55, 34, 35a, 37.

The angle scraper chain face conveyor of the instant invention operates in the following manner. With the drive means activated, the axle 33 mounting the drive pulleys 31, 32 is brought in rotation. The drive pulleys 31, 32 interact with the chain assemblies 18, 19 closed over the deflector pulleys 38, 57, 53, 56, 35, 36 and 39, 58, 54, 52, 55, 34, 35a, 37 and draw said chain assemblies. This causes the movement of the flights 26 fastened to the chain assemblies 18, 19 situated in the pan line 1 of the conveyor.

As stated above, the flights 26 acquire an L-like position when situated in the conveying channel 3 of the pan line 1.

When the flights 26 move over the deflector pulleys 55, 56 of the angle section 17, the parts 27, 28 of the flights 26 change their position with respect to the chain assemblies 18, 19. This change consists in the fact that the part 27 of the flight 26, which has been situated in the face part 5 of the pan line 1 at right angles to the conveying runs 20, 22 of the chain assemblies 18, 19, is now positioned in parallelism with the conveying runs 20, 22.

On the other hand, the part 28 of the flight 26, which has been situated in the face part 5 of the pan line 1 in parallelism with the conveying runs 20,22 of the chain assemblies 18, 19, now acquires a position at right angles to the conveying runs 20, 22 in the gate part 6 of the pan line 1. Therefore, the parts 27 of the flights 26 act on the coal being conveyed in the face part 5, while the parts 28 of the flights 26 act on the coal in the gate part 6.

As a result, the direction of conveying is changed by 90° on the angle section practically without turning the parts 27, 28 of the flight 26 on a radius. The action exerted by the pulling device 48 on the second part 43 of the drive section 30 ensures that the chain assemblies 18, 19 make good contact with the drive pulleys 31, 32 and with the corresponding deflector pulleys 38, 57, 53, 56, 35, 36 and 39, 58, 54, 52, 55, 34, 35a, 37.

When the second part 43 of the drive section 30 is influenced by the pulling device 48, the stable position of the second part 43 with respect to the parts 42 and 44 of the drive section 30 is achieved through the use of the guides 46 on the parts 42, 44 and the grips 47 on the part 43.

When passing over the pulleys 34, 35, 35a, the parts 27, 28 of the flights 26 start changing their mutual position, with the result that they form gradually a single line. This is achieved by virtue of the joint members 29 which couple the parts 27, 28 of the flights 26.

The flights 26 are able to pass between the deflector pulleys 34, 35, 35a and then travel over the drive pulleys 31, 32 and the deflector pulleys 38, 39 towards the return channel 4 on account of the gap 40a set up between said deflector pulleys. With the latter situated as described above, the flights 26 do not seize while leaving the conveying channel 3 and entering the return channel 4 and no extra loads are applied to the joint members 24, 25, 29, thereby improving the operational reliability of the conveyor.

The deflector pulleys 57, 58, which are rotatably mounted on the axles 40, direct the flights 26 into the return channel 4 of the face part 5 of the pan line 1. Here the flights 26 are allowed to move on account of the gap 40a that is set up between the deflector pulleys 57, 58.

When the parts 27, 28 of the flights 26 move over the return channel 4 of the face part 5 of the pan line 1, they form a single line that is parallel with the longitudinal axis of the face part 5 of the pan line 1. During the further movement of the flights 26, the deflector pulleys 53, 54 and 52 of the tail section 49 lead them into the conveying channel 3 of the face part 5 of the pan line 1. Under these circumstances, the part 27 of the corresponding flight 26 begins to act on the coal, thereby providing for its conveying, while the part 28 of that flight 26 is situated, as in its initial position, in parallelism with the geometric longitudinal axis of the face part 5 of the pan line 1.

Prior to reassembling the conveyor in order to obtain its version suitable for the left- or right-hand face operation, it should be knocked down into individual sub-assemblies.

To make for better understanding of the reassembly procedure, FIG. 9 is a diminished plan view of the conveyor of FIG. 1 intended for left-hand face operation, and FIG. 10 is a plan view of the conveyor, drawn to the scale of FIG. 9, intended for right-hand face operation. Thus, the above discussion deals with the gate part 6 positioned with respect to the face part 5 as is shown in FIGS. 1 and 9.

To reassemble the conveyor so as to obtain its version to be operated in another face, proceed as follows. Arrange the first part 42 of the drive section 30 in such a manner that it acquires the position of the part 42b shown in FIG. 10. Attach the pans 2 forming the face part 5 to the part 42b one after another by turning them in a horizontal plane so that they acquire the position of the pans 2a. The pans 2a so installed form the face part 5a of the conveyor. Turn the angle section 17 in a horizontal plane by 90° to the position 17a and attach it to the most distant end face 57 of the face part 5a as to the part 42b so that its end face 58a adjoins the end face 57a as is shown in FIG. 10. Attach to the end face 59 of the angle section 17a the pans 2 that form the gate part 6a of the conveyor. After that, fasten the first part 50 of the tail section 49, which now occupies the position 50a, to the most distant pan 2a, as to the angle section 17a, of the gate part 6a.

Install the second part 43 and the third part 44 of the drive section 30a which occupy, respectively, the positions of parts 43a, 44a. To this end, turn said parts in the seam plane in such a manner that the side surface 60 (FIG. 9) of the third part 44, which has been maintained vacant, now becomes a base surface 60a (FIG. 10). The parts 50a and 44a are coupled together by means of the plate 45a.

To complete the reassembly procedure, the chain assemblies 18, 19 and also the second part 51 are installed, the second part 51 occupying the position of a part 51a of a tail section 49a.

The conveyor of the invention in which the gate part 6 is situated differently with respect to the face part 5 of the pan line 1, namely, as is shown in FIG. 10, operates in a manner identical with that described with reference to FIG. 1.

The prototype of the conveyor of the invention was subject to many-sided tests, including bench tests and underground operation. The test results show that the conveyor of the invention offers good technical characteristics. The assembly and maintenance procedures are simple and the chain assemblies make good contact with the drive and deflector pulleys.

What is claimed is:

1. An angle scraper chain face conveyor comprising: a pan line which includes pans that couple one another in a separable fashion and form a conveying channel and a return channel; a face part of said pan line; a gate part of said pan line; an angle section adapted to couple in a separable fashion said face part with said gate part and having attachment elements adapted to couple it with said face part and said gate part which attachment elements permit the installation of said face part in place of said gate part in the process of assembling the conveyor in an opposite mine face; two chain assemblies closed horizontally, each of said chain assemblies having a conveying run situated in said conveying channel of said pan line and a return run situated in said return channel of said pan line; means for driving said chain assemblies along said pan line; flights implemented in the form of two parts which are joint-coupled with each other and with said chain assemblies; a drive section provided with drive and deflector pulleys for said chain assemblies and coupled with an end of said gate part which is most distant with respect to said face part; drive pulleys of said drive section coupled kinematically with said drive means; said drive section having three parts which couple with one another in a separable fashion, including a first part of said three parts of said drive section adapted to mount respective deflector pulleys and having a portion whose shape is the same as that of said conveying channel of said pan line, the first part of said drive section being located adjacent to said conveying channel; said first part of said drive section having attachment means for releasably coupling said first part with said gate part and said face part; a second part of said drive section adapted to mount respective deflector pulleys and having a portion whose shape is the same as that of said return channel, said second part being situated adjacent to said return channel and between said first part and a third part of said drive section; a third part of said drive section adapted to mount respective drive and deflector pulleys; said second and third parts of said drive section each having an axis of symmetry that is parallel with the geometric longitudinal axis of said gate part; a tail section having deflector pulleys for said chain assemblies and coupled with that end of said face part which is most distant with respect to said gate part; said tail section having two parts which are coupled together in a separable fashion, a first part of said two parts of said tail section adpated to mount deflector pulleys and implemented as a mirror reflection of said first part of said three parts of said drive section and situated adjacent to said conveying channel of said pan line; said first part of said tail section having attachment means for releasably coupling said first part of said tail section with said gate part and said face part; and a second part of said tail section whose shape is the same as that of the return channel of said pan line, said second part being located adjacent to said return channel.

2. An angle scraper chain face conveyor as claimed in claim 1, wherein said second part of said three parts of said drive section is implemented in the form of a carriage, which is allowed to be moved with respect to said first and third parts of said drive section.

3. An angle scraper chain face conveyor as claimed in claim 2, wherein said first and third parts of said drive section are provided with guides while said second part of said drive section is provided with grips adapted to interact with said guides.

4. An angle scraper chain face conveyor as claimed in claim 1, wherein said second part of said drive section uses two deflector pulleys mounted on vertical axles, which are spaced at some distance in a vertical plane sufficient for the flights to pass between them and which are also positioned some distance away from each other as related to the longitudinal axis of symmetry of said second part of said drive section, said latter distance being equal substantially to the distance between the joint members that couple the flight ends with the chain assemblies, with the flights situated in the conveying channel of said pan line.

5. An angle scraper chain face conveyor as claimed in claim 1, wherein said first part of said drive section uses three deflector pulleys for the conveying runs of said chain assemblies, two of said three deflector pulleys being mounted in a coaxial relation on cantilever vertical axles spaced at a distance allowing the flights to pass between them, and a third one of said three deflector pulleys being mounted on a vertical axle, that is arranged some distance away, as measured in a horizontal plane, from said vertical axles mounting the two deflector pulleys mentioned above.

6. An angle scraper chain face conveyor as claimed in claim 1, wherein said third part of said drive section uses two drive pulleys mounted on a single vertical axle and two deflector pulleys mounted in a coaxial relation on cantilever vertical axles, which are spaced at a distance allowing the flights to pass between them, the drive and deflector pulleys of said third part of said drive section being arranged along the longitudinal axis of symmetry of said third part.

7. An angle scraper chain face conveyor as claimed in claim 1, wherein said first part of said drive section uses three deflector pulleys for the conveying runs of said two chain assemblies, two of said three deflector pulleys being mounted in a coaxial relation on cantilever vertical axles spaced at a distance allowing the flights to pass between them, a third one of said three deflector pulleys being mounted on a vertical axle, that is arranged some distance away, as measured in a horizontal plane, from said vertical axles mounting said two deflector pulleys, said third part of said drive section uses two drive pulleys mounted on a single vertical axle and two deflector pulleys mounted in a coaxial relation on cantilever vertical axles, which are spaced at a distance allowing the flights to pass between them, the drive and deflector pulleys of said third part of said drive section being arranged along the longitudinal axis of symmetry of said third part, and the vertical axles mounting the deflector pulleys of the first and third parts of the drive section being adapted to lie in a single plane, the distance between the extreme deflector pulleys being selected to be equal substantially to the distance between the joint members that couple the flight ends with the chain assemblies, with the flights situated in the return channel of the pan line.

* * * * *